(12) United States Patent
Aoki et al.

(10) Patent No.: US 12,530,060 B2
(45) Date of Patent: Jan. 20, 2026

(54) ELECTRONIC APPARATUS AND EXTERIOR MEMBER

(71) Applicant: SONY GROUP CORPORATION, Tokyo (JP)

(72) Inventors: Hironori Aoki, Tokyo (JP); Hiroki Yoshida, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 194 days.

(21) Appl. No.: 18/551,880

(22) PCT Filed: Mar. 21, 2021

(86) PCT No.: PCT/JP2021/013935
§ 371 (c)(1),
(2) Date: Sep. 22, 2023

(87) PCT Pub. No.: WO2022/208773
PCT Pub. Date: Oct. 6, 2022

(65) Prior Publication Data
US 2024/0176402 A1 May 30, 2024

(51) Int. Cl.
*G06F 1/16* (2006.01)
*H04M 1/02* (2006.01)
*H04N 23/52* (2023.01)

(52) U.S. Cl.
CPC ........ *G06F 1/1686* (2013.01); *H04M 1/0264* (2013.01); *H04N 23/52* (2023.01); *H04M 2250/52* (2013.01)

(58) Field of Classification Search
CPC .............. G06F 1/1686; H04M 1/0264; H04M 2250/52; H04M 1/18; H04N 23/52;
(Continued)

(56) References Cited

U.S. PATENT DOCUMENTS 9,395,602 B2 7/2016 Havskjold
2019/0094920 A1* 3/2019 Qiu ........................ H04N 23/57
(Continued)

FOREIGN PATENT DOCUMENTS

CN 107241537 A 10/2017
CN 108600594 A 9/2018
(Continued)

OTHER PUBLICATIONS

International Search Report and Written Opinion of PCT Application No. PCT/JP2021/013935, issued on Jun. 29, 2021, 11 pages of ISRWO.

*Primary Examiner* — Timothy J Henn
(74) *Attorney, Agent, or Firm* — CHIP LAW GROUP

(57) ABSTRACT

Provided is an electronic apparatus having a structure of mounting a camera suitable for thickness reduction and an exterior member. The electronic apparatus includes a camera module, an exterior panel, a frame member, and a window member. The camera module includes a lens. The exterior panel has a uniform thickness, and has a first main surface on a side of an internal space in which the camera module is housed, and a second main surface on a side opposite to the first main surface. The frame member surrounds the lens as viewed from a direction perpendicular to the second main surface, and has a first area that faces the second main surface and is bonded to the second main surface, and a second area on a side opposite to the second main surface. The window member is bonded to the second area and covers the lens.

9 Claims, 15 Drawing Sheets

(58) Field of Classification Search
CPC .... H04N 23/51; H04N 23/57; G02B 27/0006; G03B 30/00; G03B 17/02
See application file for complete search history.

(56) References Cited

U.S. PATENT DOCUMENTS

2020/0059579 A1* 2/2020 Jarvis .................... G06F 1/1684
2020/0186630 A1   6/2020 Bao
2021/0037125 A1   2/2021 Jung et al.
2022/0377162 A1* 11/2022 Ma ...................... H04M 1/0264

FOREIGN PATENT DOCUMENTS

| CN | 111756898 A   | 10/2020 |
|----|---------------|---------|
| EP | 3484140 A1    | 5/2019  |
| JP | 2010-500623 A | 1/2010  |
| JP | 2019-089697 A | 6/2019  |
| JP | 2020-126231 A | 8/2020  |

\* cited by examiner

ELECTRONIC APPARATUS AND EXTERIOR MEMBER

CROSS REFERENCE TO RELATED APPLICATIONS

This application is a U.S. National Phase of International Patent Application No. PCT/JP2021/013935 filed on Mar. 31, 2021. Each of the above-referenced applications is hereby incorporated herein by reference in its entirety.

TECHNICAL FIELD

The present technology relates to an electronic apparatus that includes a camera and an exterior member.

BACKGROUND ART

An electronic apparatus that includes a camera, such as a smartphone, has become widespread. The camera is mounted on the exterior member of the electronic apparatus in consideration of strength and waterproofness, and also functions as a design accent. For this reason, various types of structures of mounting a camera have been studied. For example, Patent Literature 1 discloses an optical lens assembly for an electronic apparatus in which an optical lens group is supported by a shock absorbing mount.

CITATION LIST

Patent Literature

Patent Literature 1: Japanese Unexamined Patent Application Publication No. 2010-500623

DISCLOSURE OF INVENTION

Technical Problem

In recent years, along with the miniaturization and thickness reduction of an electronic apparatus such as a smartphone, there has been a demand for further studies on the structure of mounting a camera. This is because the camera has an optical part and a drive mechanism thereof and is relatively thick among parts to be mounted on the electronic apparatus. In particular, the higher the performance of the camera, the lager the number of optical parts, and the structure of mounting a camera greatly affects the size of the electronic apparatus.

In view of the circumstances as described above, it is an object of the present technology to provide an electronic apparatus having a structure of mounting a camera suitable for thickness reduction and an exterior member.

Solution to Problem

In order to achieve the above-mentioned object, an electronic apparatus according to the present technology incudes: a camera module; an exterior panel; a frame member; and a window member.

The camera module includes a lens.

The exterior panel has a uniform thickness, and has a first main surface on a side of an internal space in which the camera module is housed, and a second main surface on a side opposite to the first main surface.

The frame member surrounds the lens as viewed from a direction perpendicular to the second main surface, and has a first area that faces the second main surface and is bonded to the second main surface, and a second area on a side opposite to the second main surface.

The window member is bonded to the second area and covers the lens.

The second main surface may have a coating area with a coating and a non-coating area with no coating.

The first area may be bonded to the non-coating area.

The coating may be an anti-fingerprint coating.

The exterior panel may be formed of glass.

The coating may be painting.

The exterior panel may be formed of a synthetic resin.

The first area may be bonded to the second main surface by an adhesive.

The electronic apparatus may further include an internal part that is housed in the internal space and abuts on the exterior panel when the exterior panel is bent to support the exterior panel.

The camera module may be a periscope camera module.

In order to achieve the above-mentioned object, an exterior member according to the present technology includes: an exterior panel; a frame member; and a window member.

The exterior panel has a uniform thickness, and has a first main surface on a side of an internal space in which a camera module is housed, and a second main surface on a side opposite to the first main surface.

The frame member surrounds a lens of the camera module as viewed from a direction perpendicular to the second main surface, and has a first area that faces the second main surface and is bonded to the second main surface, and a second area on a side opposite to the second main surface.

The window member is bonded to the second area and covers the lens.

MODE(S) FOR CARRYING OUT THE INVENTION

An electronic apparatus according to an embodiment of the present technology will be described.
[Configuration of Electronic Apparatus]

Figure 1:
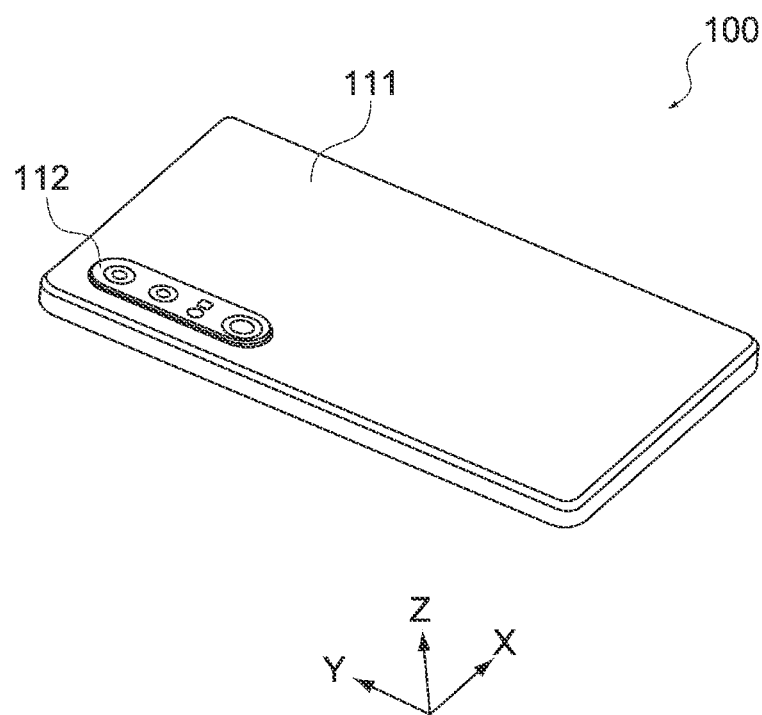
FIG. 1 is a perspective view of an electronic apparatus according to an embodiment of the present technology.

FIG. 1 is a perspective view of an electronic apparatus 100 according to his embodiment. The electronic apparatus 100 is a smartphone, but may be another electronic apparatus including a camera, such as a tablet terminal and a portable game console. Note that FIG. 1 shows a surface of the electronic apparatus 100 on the side opposite to the display. Hereinafter, this surface will be referred to as a back surface the electronic apparatus 100.

Figure 2:
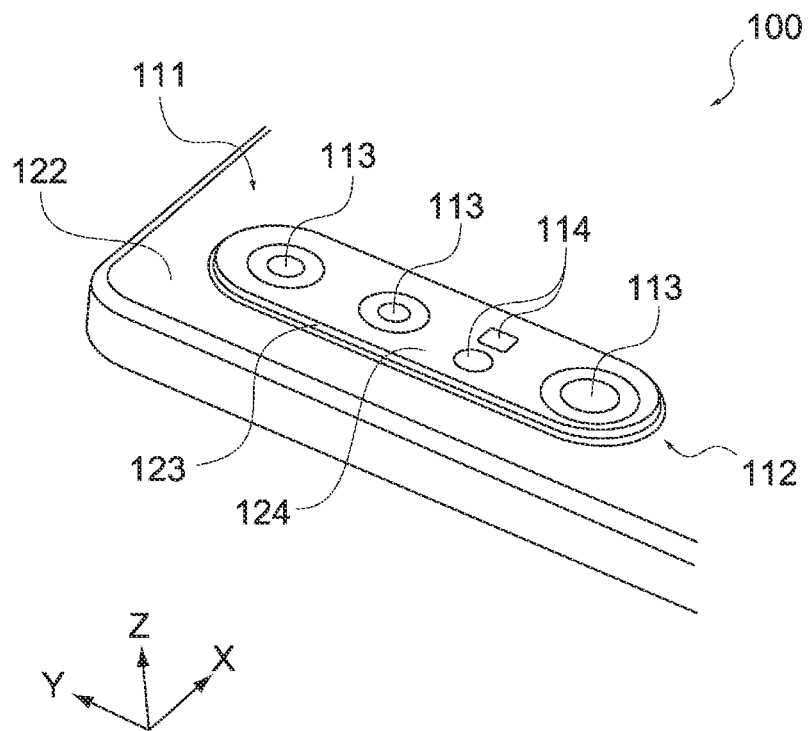
FIG. 2 is an enlarged perspective view of part of the electronic apparatus.
Figure 3:
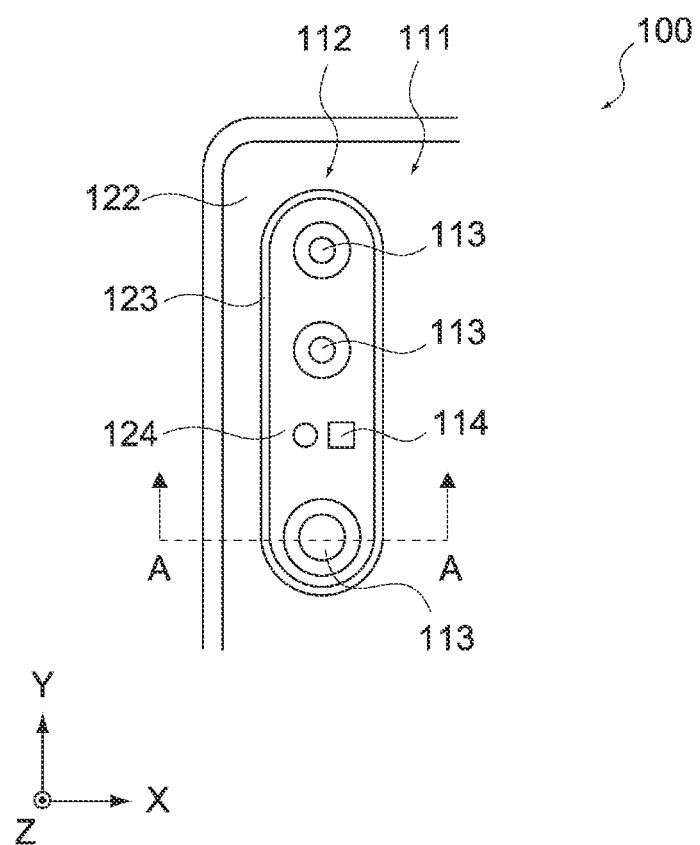
FIG. 3 is an enlarged plan view of part of the electronic apparatus.

FIG. 2 is a perspective view showing enlarged part of FIG. 1. As shown in the figure, the electronic apparatus 100 includes a body portion 111 and a camera unit 112. The body portion 111 occupies most of the back surface and includes an exterior panel described below. The camera unit 112 is provided on part of the back surface and is a portion in which three cameras 113 and an autofocus sensor 114 are mounted. FIG. 3 is a plan view of the vicinity of the camera unit 112, of the electronic apparatus 100.

The cameras 113 are a wide-angle camera, a telephoto camera, and a standard camera. Note that the types of the cameras 113 are not limited thereto. Further, also the number of cameras 113 provided in the camera unit 112 is not limited to three and the camera unit 112 only needs to include at least one camera 113. The autofocus sensor 114 is a sensor that acquires the distance between the electronic apparatus 100 and a subject. Note that the autofocus sensor 114 does not necessarily need to be provided in the camera unit 112.

Figure 4:
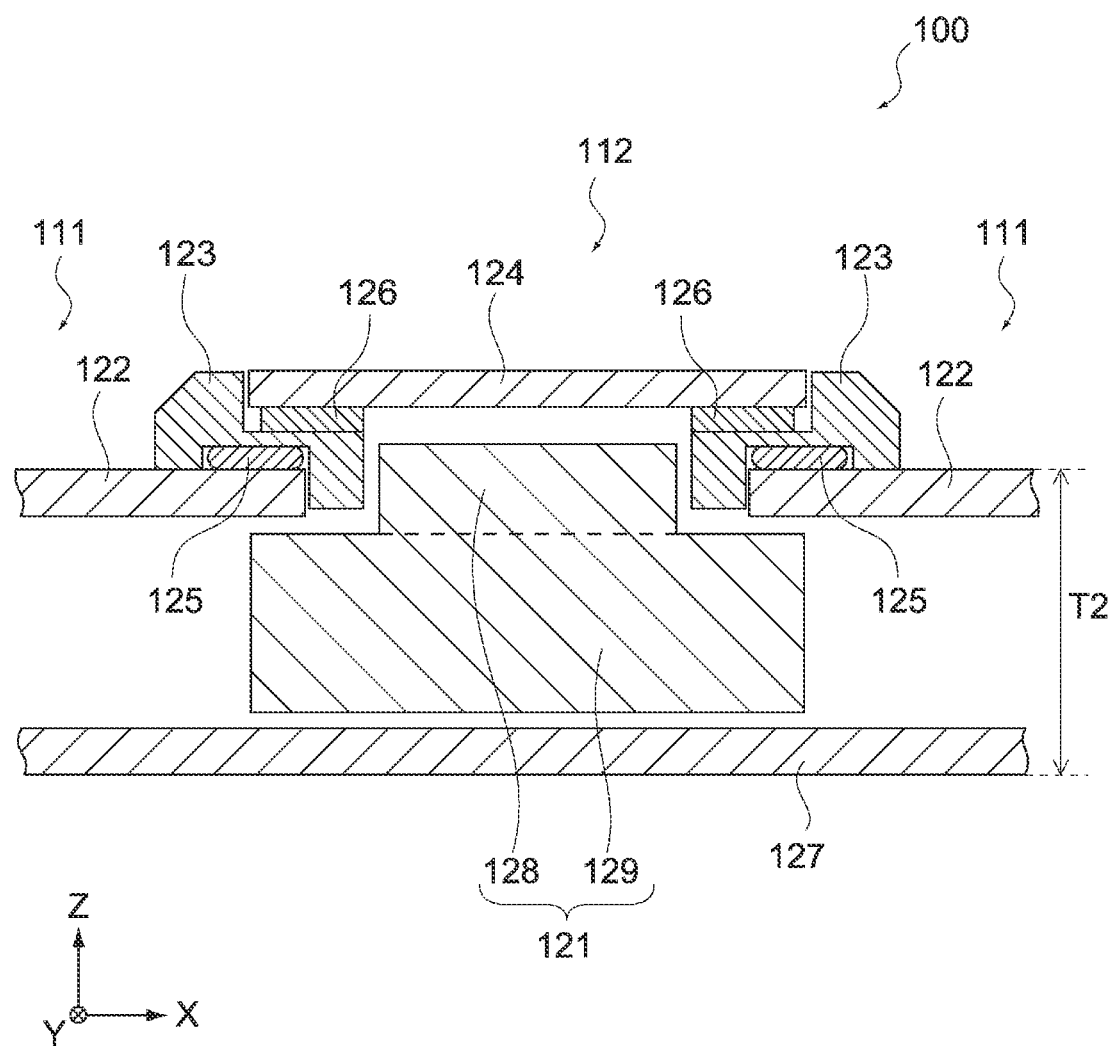
FIG. 4 is a cross-sectional view of the vicinity of a camera unit of the electronic apparatus.
Figure 5:
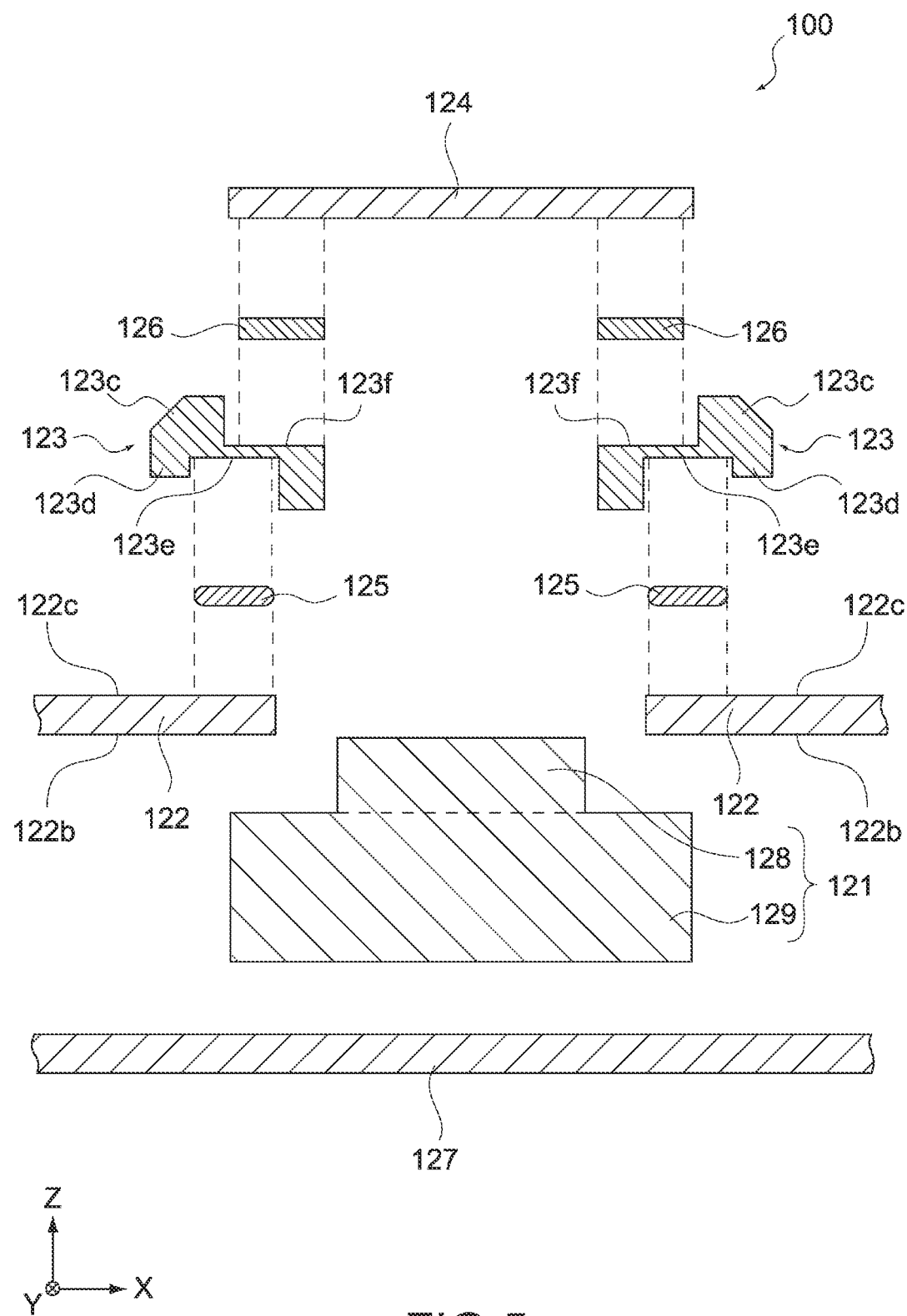
FIG. 5 is a schematic diagram showing an exploded view of a member in the vicinity of the camera unit of the electronic apparatus.

FIG. 4 is a cross-sectional view of the vicinity of the camera unit 112, of the electronic apparatus 100, and is a cross-sectional view taken along the line A-A in FIG. 3. FIG. 5 is a schematic cross-sectional view showing an exploded view of the respective parts in FIG. 4. As shown in these figures, the electronic apparatus 100 includes a camera module 121, an exterior panel 122, a frame member 123, a window member 124, an adhesive 125, an adhesive paper 126, and a display panel 127. Note that the exterior panel 122, the frame member 123, the window member 124, the adhesive 125, and the adhesive paper 126 are collectively referred to as an exterior member of the electronic apparatus 100.

The camera module 121 forms the camera 113 and includes a lens 128 and an image generation unit 129. The lens 128 is an imaging optical system of the camera module 121 and may be one including one or a plurality of lenses.

The image generation unit 129 includes an image sensor and generates an image from light that has entered from the lens 128.

Figure 6:
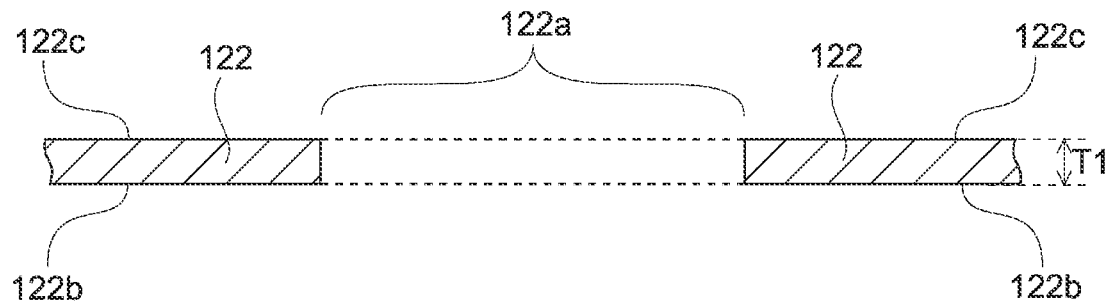
FIG. 6 is a cross-sectional view of the vicinity of a camera unit of an exterior panel included in the electronic apparatus.
Figure 6:
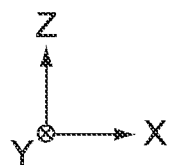

The exterior panel 122 forms the exterior of the electronic apparatus 100. FIG. 6 is a cross-sectional view of the vicinity of the camera unit 112 of the exterior panel 122, and the cross-sectional position is the same as that in FIG. 5. As shown in the figure, the exterior panel 122 is a panel having a uniform thickness T1 and formed of glass, a synthetic resin, or a metal. The exterior panel 122 includes an opening 122a. The opening 122a is an opening in which the camera unit 112 is disposed. The exterior panel 122 forms an internal space in which the camera module 121 and another constituent part of the electronic apparatus 100 are housed. Hereinafter, of the main surfaces of the exterior panel 122, a main surface on the side of the internal space will be referred to as a first main surface 122b and a main surface on the side opposite to the first main surface 122b will be referred to as a second main surface 122c.

Figure 7:
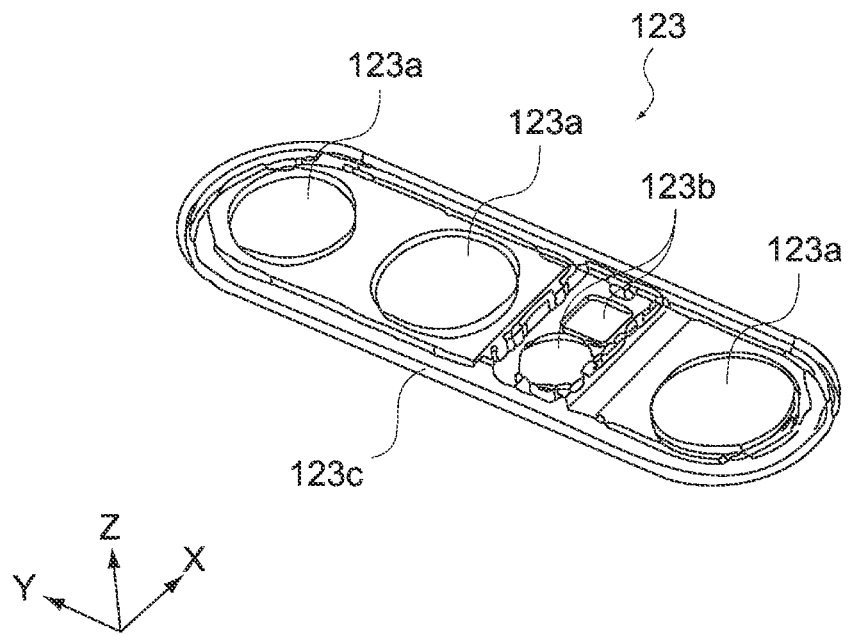
FIG. 7 is a perspective view of a frame member included in the electronic apparatus.

The frame member 123 decorates the camera unit 112 and supports the window member 124. The frame member 123 is formed of a metal such as aluminum or a synthetic resin. FIG. 7 is a perspective view of the frame member 123. As shown in FIG. 7, the frame member 123 includes an opening 123a and an opening 123b. The opening 123a is an opening for exposing the lens 128 of each camera module 121, and the opening 123b is an opening for exposing the autofocus sensor 114.

Figure 8:
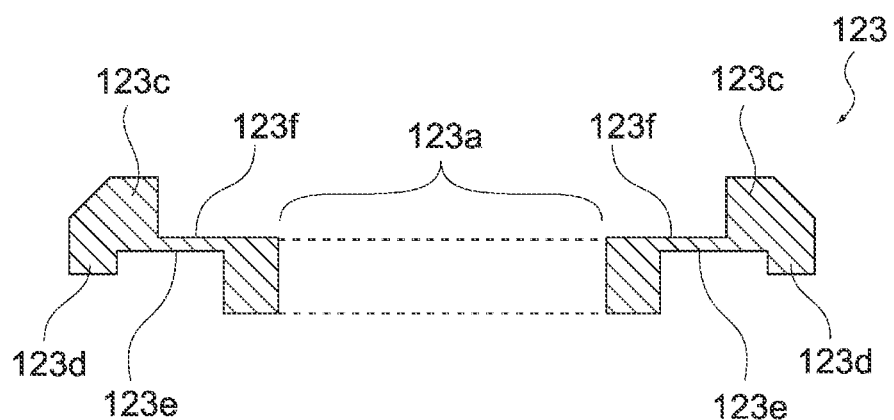
FIG. 8 is a cross-sectional view of the frame member.
Figure 9:
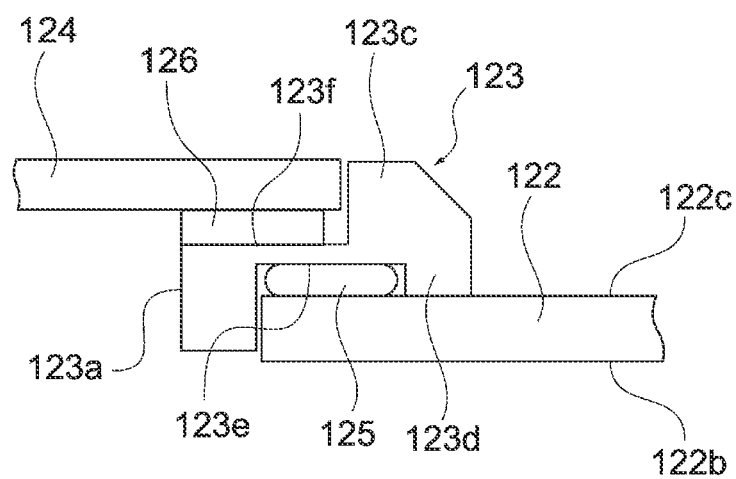
FIG. 9 is a schematic diagram showing how the frame member and other members are bonded together.
Figure 10:
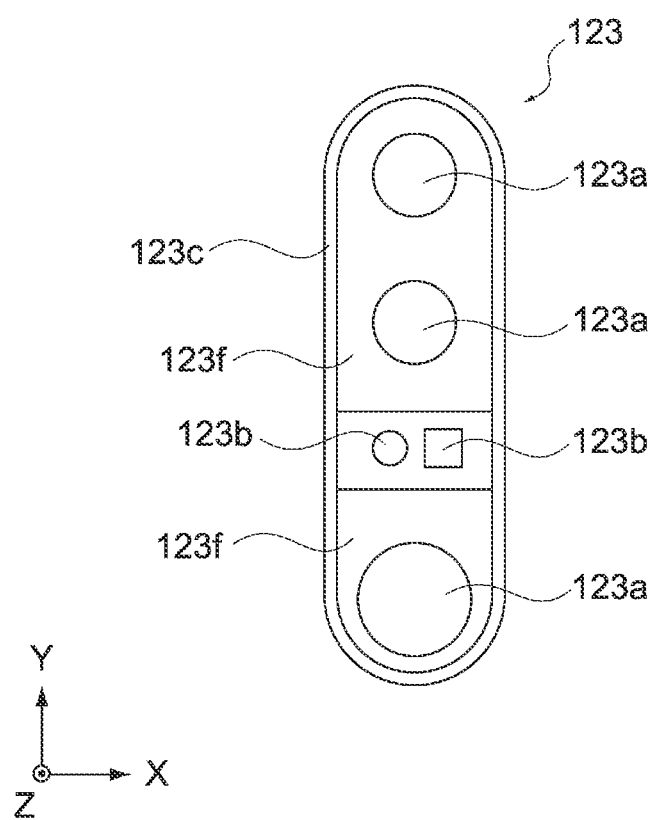
FIG. 10 is a plan view of a surface side of the frame member.
Figure 11:
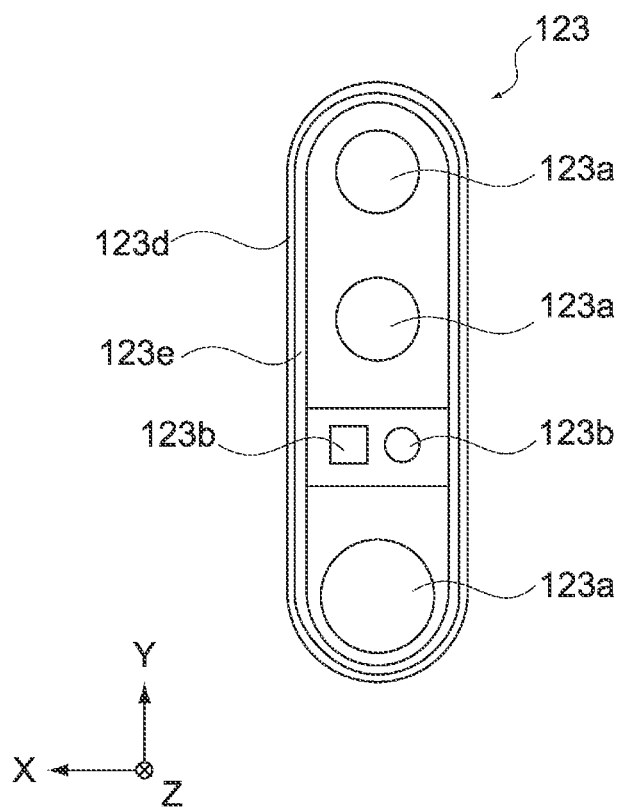
FIG. 11 is a plan view of a back surface side of the frame member.

FIG. 8 is a cross-sectional view of the vicinity of the camera unit 112 of the frame member 123, and the cross-sectional position is the same as that in FIG. 5. FIG. 9 is a schematic diagram showing the bonding relationship between the frame member 123 and other members. FIG. 10 is a plan view of the surface of the frame member 123 on the side opposite to the second main surface 122c, and FIG. 11 is a plan view of the surface of the frame member 123 on the side of the second main surface 122c. Note that in the following, the surface of the frame member 123 on the side opposite to the second main surface 122c (see FIG. 10) will be referred to as the surface of the frame member 123 and the surface of the frame member 123 on the side of the second main surface 122c (see FIG. 11) will be referred to as the back surface of the frame member.

As shown in FIG. 8 and FIG. 10, an outer periphery portion 123c is provided on the side of the surface of the frame member 123. The outer periphery portion 123c is an annular portion that protrudes in the direction opposite to the second main surface 122c at the outer peripheral edge of the frame member 123, surrounds the lens 128 of each camera module 121 as seen from the direction perpendicular to the second main surface 122c of the exterior panel 122 (Z direction), and is exposed on the second main surface 122c to decorate the camera unit 112.

Further, as shown in FIG. 8 and FIG. 11, an abutting portion 123d is provided on the side of the back surface of the frame member 123. The abutting portion 123d is an annular portion that protrudes toward the side of the second main surface 122c at the outer peripheral edge of the frame member 123, and abuts on the second main surface 122c as shown in FIG. 9.

Further, as shown in FIG. 8 and FIG. 11, the frame member 123 has a first area 123e the back surface side. The first area 123e is an annular area provided on the inner peripheral side of the abutting portion 123d. The first area 123e faces the second main surface 122c and is bonded to the second main surface 122c by the adhesive 125 as shown in FIG. 9. The first area 123e is formed in a recessed shape with respect to the abutting portion 123d and forms a space to be filled with the adhesive 125 between the first area 123e and the second main surface 122c by being spaced apart from the second main surface 122c as compared with the abutting portion 123d.

Further, as shown in FIG. 8 and FIG. 10, the frame member 123 has a second area 123f on the surface side. The second area 123f is an area provided on the inner peripheral side of the outer periphery portion 123c and around the opening 123a. The second area 123f faces the window member 124 and is bonded to the window member 124 by the adhesive paper 126 as shown in FIG. 9. The second area 123f is formed in a projecting shape with respect to the outer periphery portion 123c and forms a space in which the adhesive paper 126 and the window member 124 are disposed.

The window member 124 is bonded to the frame member 123 and covers the lens 128 of each camera module 121 and the autofocus sensor 114. The window member 124 is formed of a material having optical transparency, such as glass and a synthetic resin. As shown in FIG. 9, the window member 124 is bonded to the second area 123f of the frame member 123 by the adhesive paper 126.

The adhesive 125 is deposited between the second main surface 122c of the exterior panel 122 and the first area 123e of the frame member 123 (see FIG. 9) to bond the exterior panel 122 and the frame member 123 together. The adhesive 125 is suitably a waterproof adhesive capable of preventing moisture from permeating between the exterior panel 122 and the frame member 123. The adhesive 125 may be heat curable, UV curable, or moisture curable.

The adhesive paper 126 is disposed between the window member 124 and the second area 123f of the frame member 123 (see FIG. 9) to bond the window member 124 and the frame member 123 together. The adhesive paper 126 is suitably a waterproof adhesive paper capable of preventing moisture from permeating between the window member 124 and the frame member 123. Note that an adhesive may be used instead of the adhesive paper 126.

The display panel 127 is provided on the side opposite to the exterior panel 122 in the electronic apparatus 100 and performs image display and touch detection. As shown in FIG. 4, a thickness T2 from the exterior panel 122 to the display panel 127 will be referred to as a "set thickness".

The electronic apparatus 100 has the configuration as described above. The configuration of the electronic apparatus 100 is not limited to that described above and can be modified as appropriate. For example, the electronic apparatus 100 may include a plurality of camera units 112.

The exterior member of the electronic apparatus 100 can be prepared by bonding the window member 124 to the frame member 123 with the adhesive paper 126 and then bonding the frame member 123 to the exterior panel 122 with the adhesive 125. By using the adhesive 125 to bond the frame member 123 and the exterior panel 122 together, it is possible to bring the abutting portion 123d of the frame member 123 (see FIG. 9) into close contact with the exterior panel 122. If adhesive paper were used to bond the frame member 123 and the exterior panel 122 together, a gap is generated between the abutting portion 123d and the exterior panel 122 due to the tolerance of parts and the lifting after crimping. By using the adhesive 125, such a gap can be prevented from occurring.

[Regarding Coating]

Figure 12:
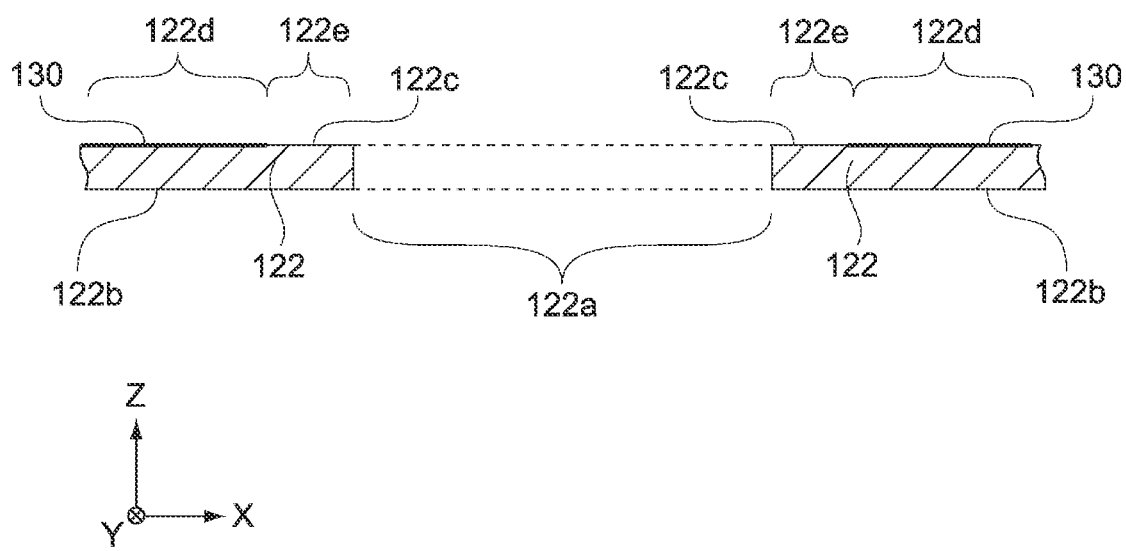
FIG. 12 is a schematic diagram showing a coating applied to the exterior panel.

A coating may be provided on the second main surface 122b of the exterior panel 122. FIG. 12 is a cross-sectional view of the exterior panel 122 in which a coating is provided. As shown in the figure, the second main surface 122c has a coating area 122d and a non-coating area 122e. The coating area 122d is provided at a position spaced apart from the opening 122a and is an area in which a coating 130 is applied onto the second main surface 122c. The non-coating area 122e is provided in the vicinity of the peripheral edge of the opening 122a and is an area in which the coating 130 is not applied onto the second main surface 122c.

In the case where the exterior panel 122 is formed of glass, the coating 130 is an anti-fingerprint coating, e.g., a fluororesin coating. In the case where the exterior panel 122 is formed of a synthetic resin, the coating 130 is painting. In the case where the exterior panel 122 is formed of a metal, the coating 130 is an anodized film or painting. Note that the non-coating area 122e can be prepared by masking before forming the coating 130.

Figure 13:
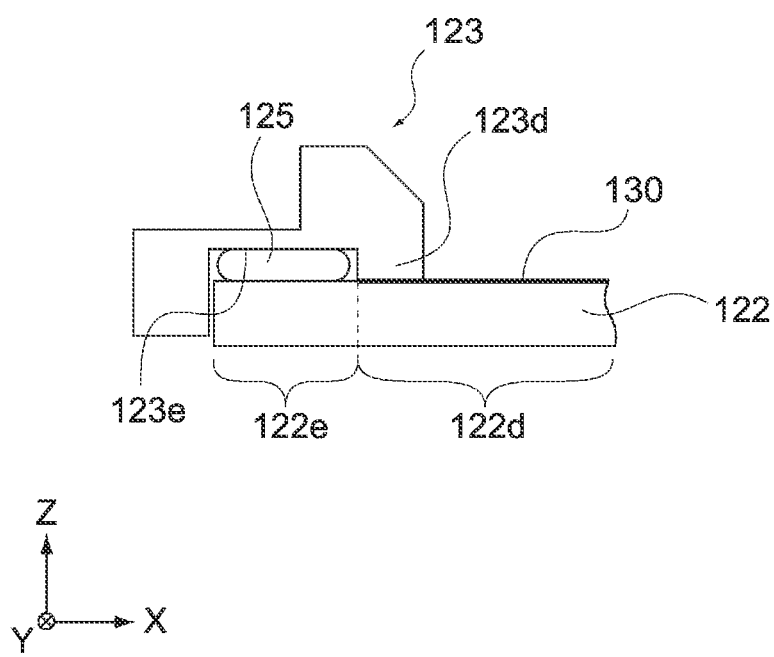
FIG. 13 is a schematic diagram showing a positional relationship between the coating and the frame member.

FIG. 13 is a schematic diagram showing how the exterior panel 122 to which the coating 130 is provided and the frame member 123 are bonded together. As shown in the figure, in the frame member 123, the first area 123e is bonded to the non-coating area 122e by the adhesive 125. The coating 130 repels an adhesive and thus is difficult to bond with an adhesive. For this reason, by providing the non-coating area 122e and bonding the adhesive 125 to the non-coating area 122e, it is possible to reliably bond the frame member 123 and the exterior panel 122 together.

[Regarding Internal Part]

Figure 14:
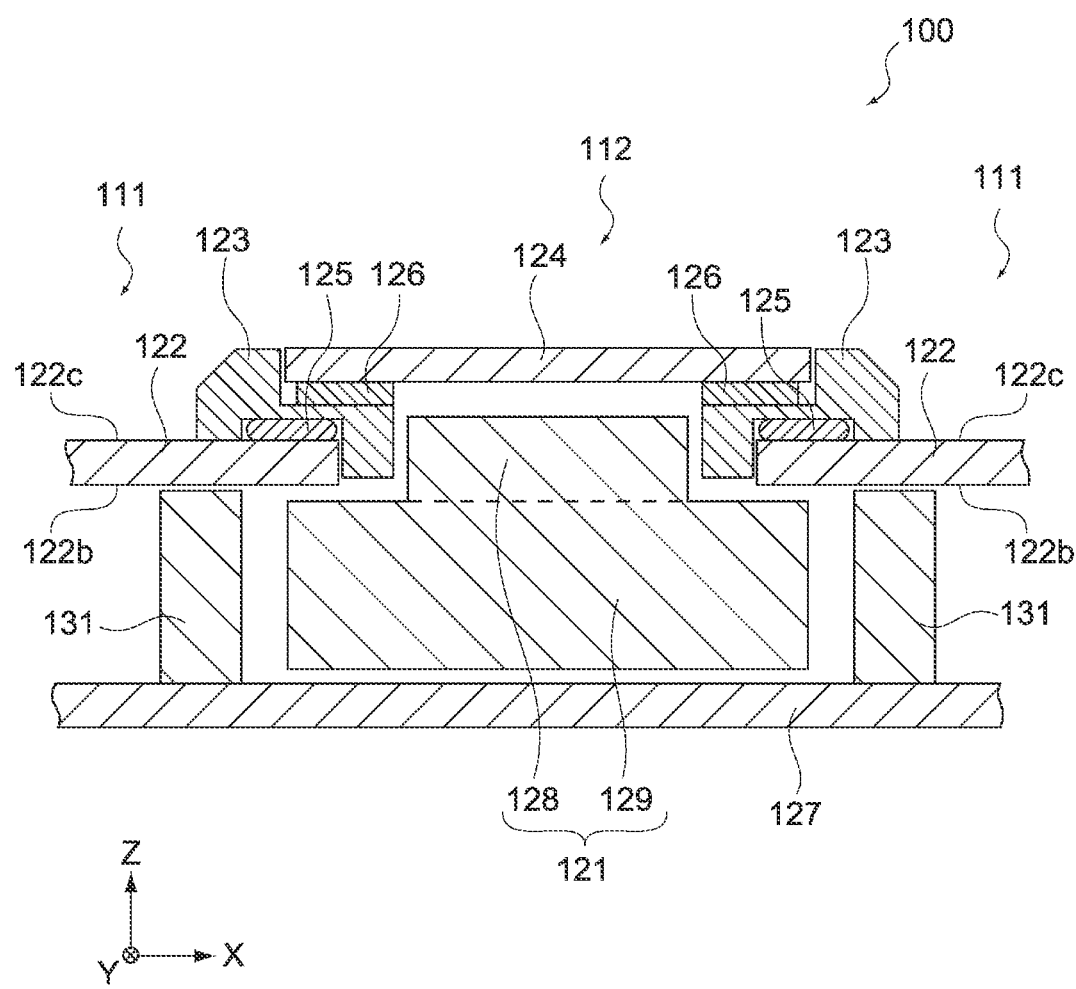
FIG. 14 is a cross-sectional view of the vicinity of a camera unit of the electronic apparatus including an internal part.

The electronic apparatus 100 may have a structure in which an internal part supports the exterior panel 122. FIG. 14 is a cross-sectional view of the electronic apparatus 100 including an internal part 131. As shown in the figure, the internal part 131 is provided in the vicinity of the camera unit 112 and disposed in proximity to the exterior panel 122.

Since the frame member 123 is bonded to the second main surface 122c in the electronic apparatus 100, there is a possibility that the exterior panel 122 receives stress from the frame member 123 when the electronic apparatus 100 receives an impact due to dropping or the like. Here, since the internal part 131 is disposed in proximity to the exterior panel 122, the first main surface 122b abuts on the internal part 131 when the exterior panel 122 is bent due to stress, and the exterior panel 122 is supported by the internal part 131 so as not to be further bent. This makes it possible to prevent the exterior panel 122 from being damaged. Note that the type of the internal part 131 is not particularly limited, and an internal frame or antenna part may be used.

[Effects of Electronic Apparatus]

Figure 15:
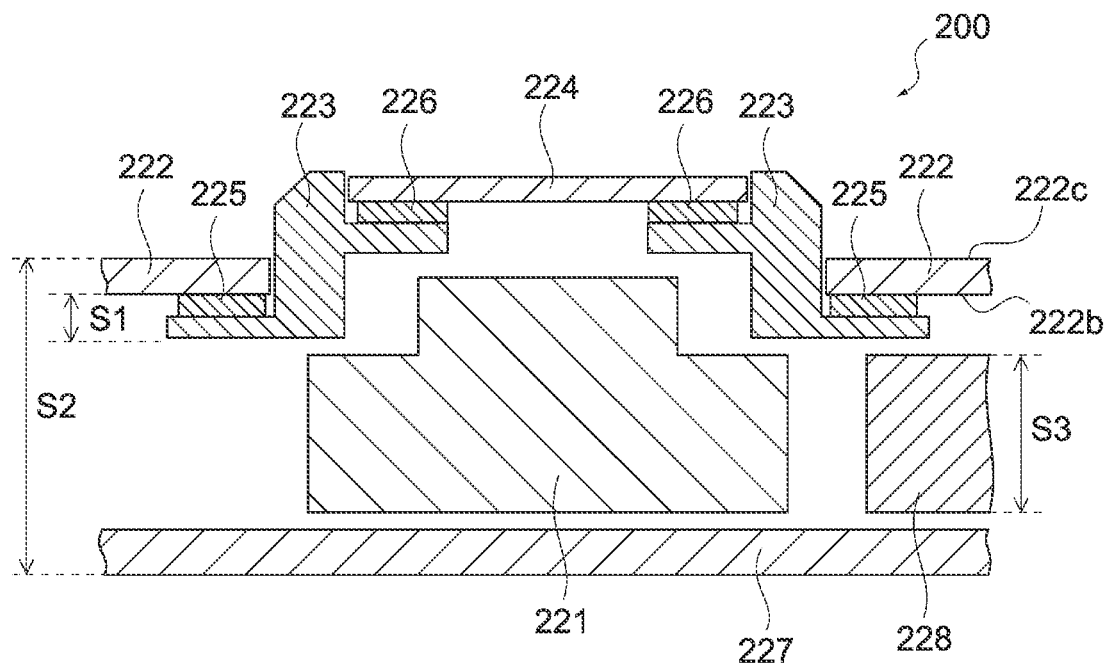
FIG. 15 is a cross-sectional view of an electronic apparatus according to a First Comparative Example.

The effects of the electronic apparatus 100 will be described in comparison with Comparative Examples. FIG. 15 is a cross-sectional view of an electronic apparatus 200 according to a First Comparative Example. As shown in the figure, the electronic apparatus 200 includes a camera module 221, an exterior panel 222, a frame member 223, a window member 224, an adhesive paper 225, an adhesive paper 226, a display panel 227, and a battery 228. The exterior panel 222 forms an internal space in which the camera module 221 and the like are housed, and has a first main surface 222b on the side of the internal space and a second main surface 222c on the side opposite to the first main surface 222b.

In this structure, the frame member 223 is bonded to the first main surface 222b of the exterior panel 222 by the adhesive paper 225. In this case, since part of the frame member 223 and the adhesive paper 225 are located inside the exterior panel 222, the set thickness of the electronic apparatus 200 (thickness S2 in the figure) increases by the amount corresponding to the thickness (thickness S1 in the figure). The thickness S1 is, for example, 0.7 mm. Particularly in recent years, the thickness S2 of the electronic apparatus 200 is often determined by the structure of the camera portion due to improvement in performance of the camera and an increase in size of the camera module. However, there is the above-mentioned thickness S1, it is difficult to reduce the thickness S2.

Further, in order to increase the battery capacity of the electronic apparatus 200, it is necessary to increase the volume of the battery 228. However, with this structure, the thickness of the battery 228 (thickness S3 in the figure) cannot be increased due to the thickness S1 described above, and it is also difficult to increase the battery capacity.

Figure 16:
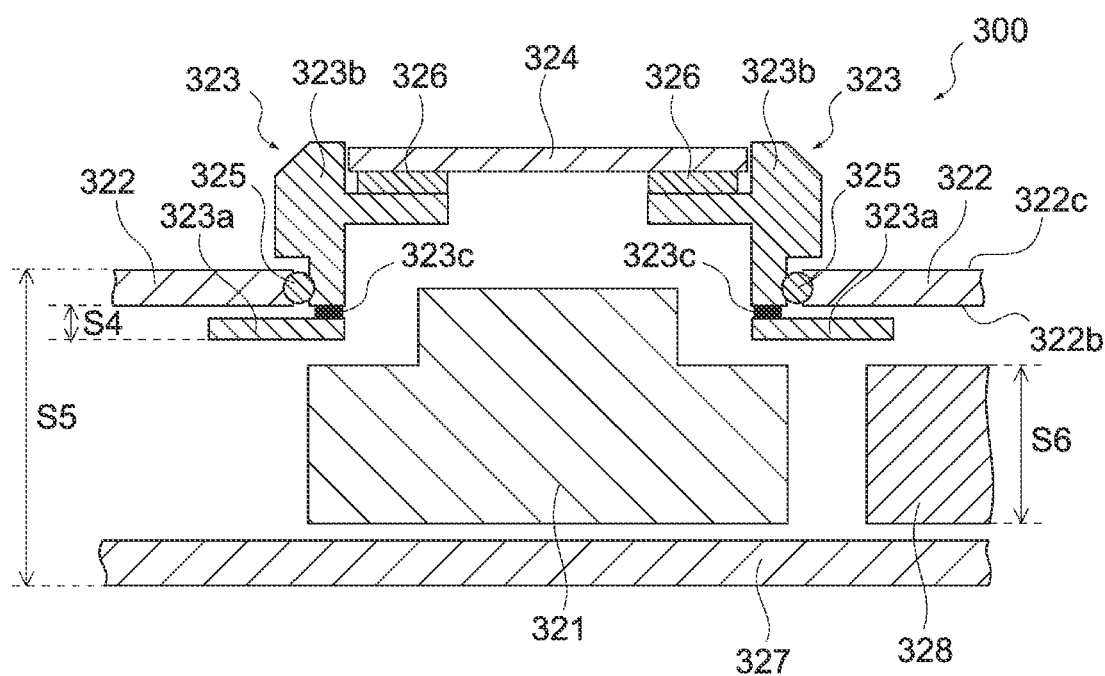
FIG. 16 is a cross-sectional view of an electronic apparatus according to a Second Comparative Example.

Further, FIG. 16 is a cross-sectional view of an electronic apparatus 300 according to a Second Comparative Example. As shown in the figure, the electronic apparatus 300 includes a camera module 321, an exterior panel 322, a frame member 323, a window member 324, a gasket 325, an adhesive paper 326, a display panel 327, and a battery 328. The frame member 323 is formed by welding a first member 323*a* and a second member 323*b* by a welding portion 323*c*. The exterior panel 322 forms an internal space in which the camera module 321 and the like are housed, and has a first main surface 322*b* on the side of the internal space and a second main surface 322*c* on the side opposite to the first main surface 322*b*.

Even with this structure, the first member 323*a* and the welding portion 323*c* are located inside the exterior panel 322, the set thickness of the electronic apparatus 300 (thickness S5 in the figure) increases by the amount corresponding to the thickness (thickness S4 in the figure), and thus it is difficult to reduce the thickness of the electronic apparatus 300. Further, the thickness of the battery 328 (thickness S6 in the figure) cannot be increased, and it is difficult to increase the battery capacity.

On the other hand, in the electronic apparatus 100 according to this embodiment (see FIG. 4), since the frame member 123 is not located inside the exterior panel 122, the set thickness of the electronic apparatus 100 (the thickness T2 in the figure) can be reduced by the amount corresponding thereto. As a result, it is possible to reduce the thickness of the electronic apparatus 100 as much as possible with respect to the thickness of the camera module 121. Further, it is possible to increase the thickness of the battery with respect to the thickness of the electronic apparatus 100 and improve the battery capacity.

[Application to Periscope Camera]

The periscope camera is a camera that bends the optical axis direction of incident light in a direction perpendicular thereto by a lens, a mirror, or the like and is capable of improving the optical performance of the camera with a large number of lenses. In the electronic apparatus 100, one or a plurality of cameras 113 may be periscope cameras.

Figure 17:
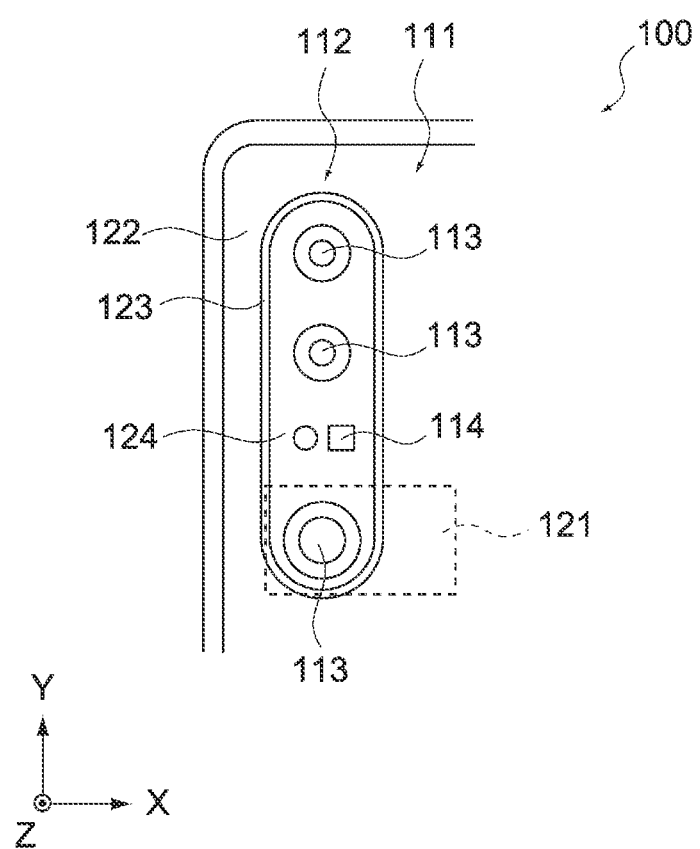
FIG. 17 is a plan view of the vicinity of a camera unit of the electronic apparatus including a periscope camera module.
Figure 18:
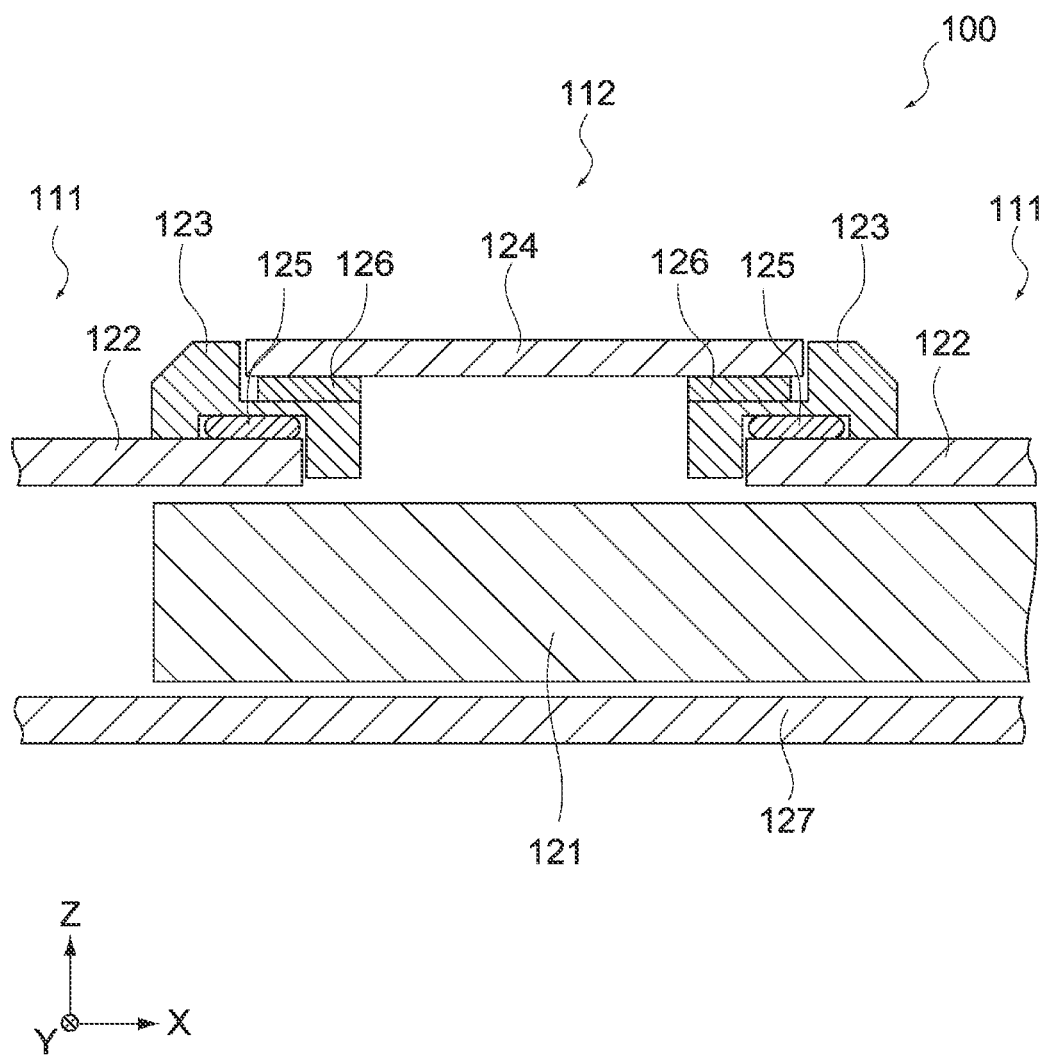
FIG. 18 is a cross-sectional view of the vicinity of a camera unit of the electronic apparatus including a periscope camera module.

FIG. 17 is a plan view of the electronic apparatus 100 including the camera 113 that is a periscope camera, and FIG. 18 is a cross-sectional view of the vicinity of the camera unit 112 of this electronic apparatus 100. As shown in FIG. 18, in the electronic apparatus 100, since the frame member 123 is not located inside the exterior panel 122, the periscope camera module 121 can also be disposed in the body portion 111. As a result, as shown in FIG. 17, the shape of the camera unit 112 is not affected by the arrangement of the camera module 121 and slimming of the camera unit 112 can be realized.

Figure 19:
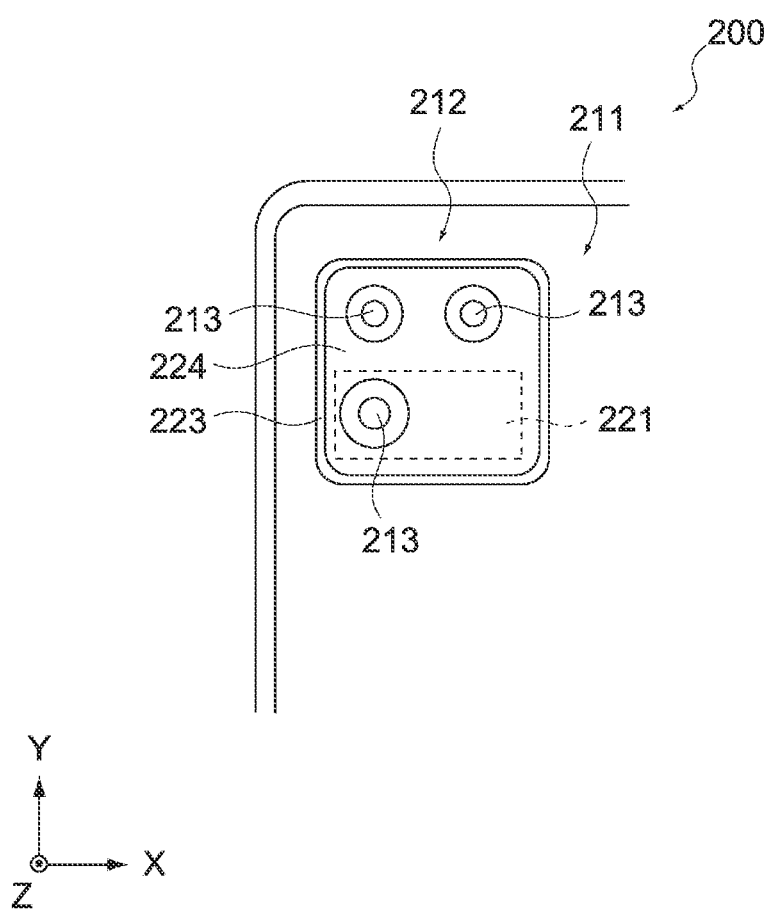
FIG. 19 is a plan view of the vicinity of a camera unit of the electronic apparatus according to the First Comparative Example including a periscope camera module.
Figure 20:
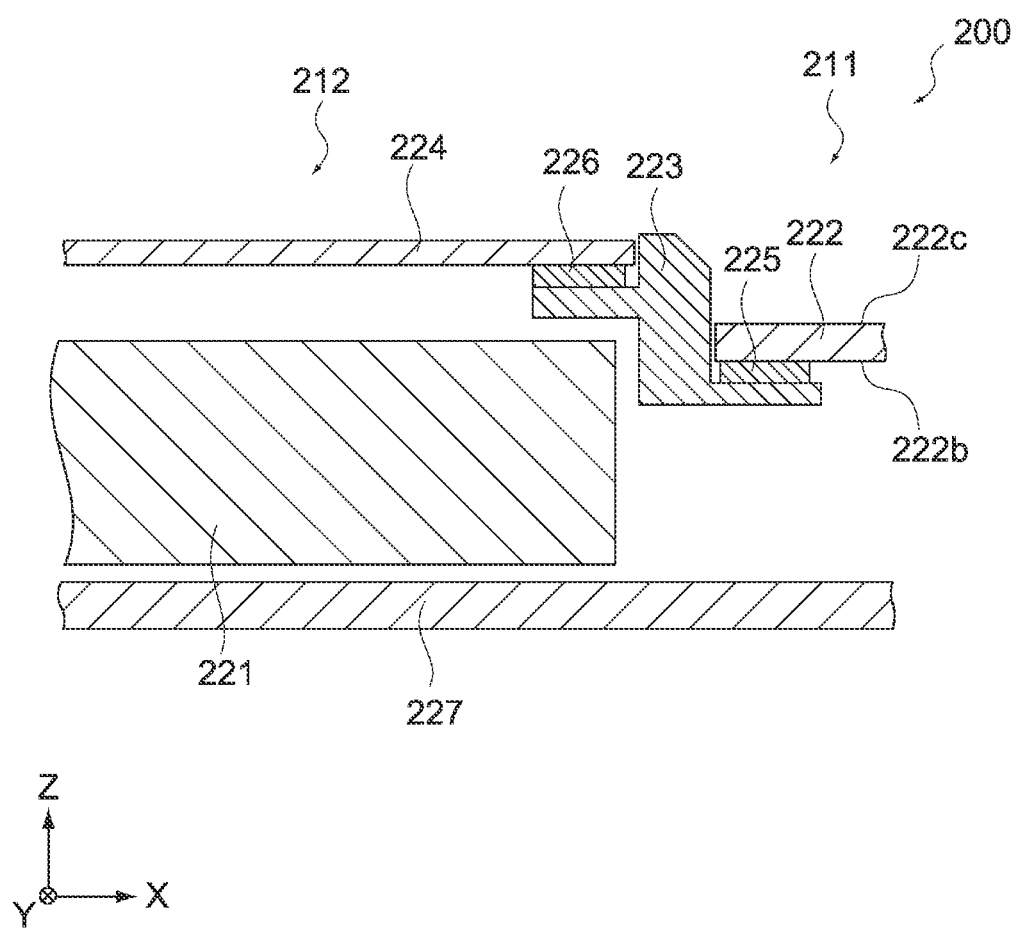
FIG. 20 is a cross-sectional view of the vicinity of a camera unit of the electronic apparatus according to the First Comparative Example including a periscope camera module.

Meanwhile, FIG. 19 is a plan view of the electronic apparatus 200 including a camera 213 that is a periscope camera, and FIG. 20 is a cross-sectional view of this electronic apparatus 200. As shown in FIG. 20, in the electronic apparatus 200, since the frame member 223 is located inside the exterior panel 222, it is necessary to house the periscope camera module 221 in a camera unit 212 in order to suppress the set thickness. For this reason, as shown in FIG. 19, the shape of the camera unit 212 is restricted by the arrangement of the camera module 221, and the product design is also affected.

Therefore, the electronic apparatus 100 has a configuration suitable for mounting a periscope camera. In addition, since in the electronic apparatus 100, the size of the camera unit 112 is not restricted with respect to a camera with a camera module having a large size or a camera module having a special shape, the electronic apparatus 100 is suitable for mounting these cameras. Note that in the case where the camera 113 is a periscope camera, a space is formed between the camera module 121 and the window member 124 as shown in FIG. 18. This is because it has a structure in common with another camera 113 that is not a periscope camera. This space can be used for designing.

[Regarding Present Disclosure]

The effects described in the present disclosure are merely examples and are not limited, and additional effects may be exerted. The description of the plurality of effects described above does not necessarily mean that these effects are exhibited simultaneously. It means that at least one of the effects described above can be achieved in accordance with the conditions or the like, and there is a possibility that an effect that is not described in the present disclosure is exerted. Further, at least two feature portions of the feature portions described in the present disclosure may be arbitrarily combined with each other.

It should be noted that the present technology may also take the following configurations.

(1) An electronic apparatus, including:
  a camera module that includes a lens;
  an exterior panel that has a uniform thickness, and has a first main surface on a side of an internal space in which the camera module is housed, and a second main surface on a side opposite to the first main surface;
  a frame member that surrounds the lens as viewed from a direction perpendicular to the second main surface, and has a first area that faces the second main surface and is bonded to the second main surface, and a second area on a side opposite to the second main surface; and
  a window member that is bonded to the second area and covers the lens.

(2) The electronic apparatus according to (1) above, in which
  the second main surface has a coating area with a coating and a non-coating area with no coating, and
  the first area is bonded to the non-coating area.

(3) The electronic apparatus according to (2) above, in which the coating is an anti-fingerprint coating.

(4) The electronic apparatus according to (3) above, in which the exterior panel is formed of glass.

(5) The electronic apparatus according to (2) above, in which the coating is painting.

(6) The electronic apparatus according to (5) above, in which the exterior panel is formed of a synthetic resin.

(7) The electronic apparatus according to any one of (1) to (6) above, in which
  the first area is bonded to the second main surface by an adhesive.

(8) The electronic apparatus according to any one of (1) to (7) above, further including
an internal part that is housed in the internal space and abuts on the exterior panel when the exterior panel is bent to support the exterior panel.
(9) The electronic apparatus according to any one of (1) to (8) above, in which
the camera module is a periscope camera module.
(10) An exterior member, including:
an exterior panel that has a uniform thickness, and has a first main surface on a side of an internal space in which a camera module is housed, and a second main surface on a side opposite to the first main surface;
a frame member that surrounds a lens of the camera module as viewed from a direction perpendicular to the second main surface, and has a first area that faces the second main surface and is bonded to the second main surface, and a second area on a side opposite to the second main surface; and
a window member that is bonded to the second area and covers the lens.

REFERENCE SIGNS LIST 100 electronic apparatus
111 body portion
112 camera unit
113 camera
121 camera module
122 exterior panel
123 frame member
124 window member
125 adhesive
126 adhesive paper
127 display panel
128 lens
129 image generation unit
130 coating
131 internal part

The invention claimed is:
1. An electronic apparatus, comprising:
a camera module that includes a lens;
an exterior panel that has a uniform thickness, wherein
the exterior panel includes a first main surface, an internal space, and a second main surface,
the first main surface is on a side of the internal space,
the internal space houses the camera module,
the second main surface is on a side opposite to the first main surface, and
the second main surface has a coating area with a coating and a non-coating area with no coating;
a frame member that surrounds the lens as viewed from a direction perpendicular to the second main surface, wherein
a first area of the frame member faces the second main surface,
the first area is bonded to the non-coating area of the second main surface, and
a second area of the frame member is on a side opposite to the second main surface; and
a window member that is bonded to the second area and covers the lens.
2. The electronic apparatus according to claim 1, wherein the coating is an anti-fingerprint coating.
3. The electronic apparatus according to claim 2, wherein the exterior panel includes glass.
4. The electronic apparatus according to claim 1, wherein the coating is painting.
5. The electronic apparatus according to claim 4, wherein the exterior panel includes a synthetic resin.
6. The electronic apparatus according to claim 1, wherein the first area is bonded to the second main surface by an adhesive.
7. The electronic apparatus according to claim 1, further comprising
an internal part that is housed in the internal space and abuts on the exterior panel in a case where the exterior panel is bent to support the exterior panel.
8. The electronic apparatus according to claim 1, wherein the camera module is a periscope camera module.
9. An exterior member, comprising:
an exterior panel that has a uniform thickness, wherein
the exterior panel includes a first main surface, an internal space, and a second main surface,
the first main surface is on a side of the internal space,
the internal space houses a camera module,
the second main surface is on a side opposite to the first main surface, and
the second main surface has a coating area with a coating and a non-coating area with no coating;
a frame member that surrounds a lens of the camera module as viewed from a direction perpendicular to the second main surface, wherein
a first area of the frame member faces the second main surface,
the first area is bonded to the non-coating area of the second main surface, and
a second area of the frame member is on a side opposite to the second main surface; and
a window member that is bonded to the second area and covers the lens.

* * * * *